US012801432B2

(12) United States Patent
Nandan et al.

(10) Patent No.: US 12,801,432 B2
(45) Date of Patent: Nov. 17, 2026

(54) HARDWARE EVENT TRIGGERED PIPELINE CONTROL

(71) Applicant: TEXAS INSTRUMENTS INCORPORATED, Dallas, TX (US)

(72) Inventors: Niraj Nandan, Plano, TX (US); Mihir Mody, Bangalore (IN); Rajasekhar Allu, Plano, TX (US); Pandy Kalimuthu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 815 days.

(21) Appl. No.: 18/175,364

(22) Filed: Feb. 27, 2023

(65) Prior Publication Data

US 2023/0385102 A1 Nov. 30, 2023

Related U.S. Application Data

(60) Provisional application No. 63/345,940, filed on May 26, 2022.

(51) Int. Cl.
*G06F 9/48* (2006.01)
*G06F 9/30* (2018.01)

(52) U.S. Cl.
CPC ........ *G06F 9/4881* (2013.01); *G06F 9/30079* (2013.01); *G06F 9/30189* (2013.01)

(58) Field of Classification Search
CPC ............... G06F 9/4881; G06F 9/30079; G06F 9/30189; G06F 9/3851; G06F 9/3867; G06F 9/52; G06F 2209/509; G06F 9/5066; G06F 9/4812; G06T 1/20
See application file for complete search history.

(56) References Cited

U.S. PATENT DOCUMENTS

| | | | | |
|---|---|---|---|---|
| 5,991,863 | A * | 11/1999 | Dao | G06F 9/3836 711/219 |
| 2016/0011907 | A1* | 1/2016 | Moyer | G06F 9/4843 718/104 |
| 2016/0283240 | A1* | 9/2016 | Mishra | G06F 9/30018 |
| 2020/0379803 | A1* | 12/2020 | Saillet | G06F 9/5027 |
| 2021/0209041 | A1* | 7/2021 | Nandan | G06F 13/1673 |

* cited by examiner

*Primary Examiner* — Jorge A Chu Joy-Davila
(74) *Attorney, Agent, or Firm* — Michelle F. Murray; Charles F. Koch

(57) ABSTRACT

Various embodiments disclosed herein relate to hardware enabled pipeline control. In a hardware acceleration system, pipelines are configured to include a hardware enable flag that allows hardware initiation of the pipeline based on triggering of a configurable event. The pipeline can be configured to set the event that triggers the initiation of the pipeline. For example, the end of pipeline of a first pipeline may trigger the initiation of a second pipeline. Accordingly, pipelines that are configured to allow hardware enable based on a specifically configured event are not subject to the extra processing required to initiate the pipeline via software in external memory and triggered by an external controller.

20 Claims, 6 Drawing Sheets

400

HTS_EVENT_GEN[0..7]

| BIT | NAME | TYPE | RESET | DESCRIPTION |
|---|---|---|---|---|
| 31:6 | RESERVED | R | 0x0 | RESERVED |
| 5:0 | evt_select | RW | 0x0 | INTERNAL hts_event INDEX FOR hts_event_gen0 |

405

410

MMR:PIPELINE_CONTROL_[0..7]

| BIT | NAME | TYPE | RESET | DESCRIPTION |
|---|---|---|---|---|
| 31:5 | RESERVED | R | 0x0 | RESERVED |
| 4:2 | **hw_en_evtselect** | RW | 0x0 | HW TRIGGERED PIPELINE ENABLE ON INTERNALLY GENERATED hts_event[hw_en_evtselect] |
| 1 | **hw_en** | RW | 0x0 | HW EVENT TRIGGERED PIPELINE 0 ENABLE, '1': ACTIVATE PIPELINE TO RECEIVE HW EVENT AS DESCRIBED IN hw_en_evtselect AND hts_event_gen.evt_select , '0' : HW EVENT BASED PIPELINE IS NOT ENABLED |
| 0 | pipe_en | RW | 0x0 | PIPELINE 0 ENABLE, WRITING '1' ACTIVATE PIPELINE, WRITING '0' DURING ACTIVE PIPELINE IS ILLEGAL AND BEHAVIOR IS UNDEFINED, READ '1' -> PIPELINE IS ACTIVE, READ '0' -> PIPELINE IS INACTIVE |

| BIT | NAME | DESCRIPTION |
|---|---|---|
| 13:11 | block_pend_clrselect | hts_event_gen[block_pend_clrselect] WILL BE USED TO CLEAR BLOCKED PEND IN SUPER PIPELINE |
| 10 | block_pend_autoclr_en | '1' -> ENABLE CLEARING BLOCK PEND STATUS AT PRODUCER SOCKET 0 BY hts_event_gen[block_pend_clrselect], '0' DISABLE |

415

FIG. 4

HARDWARE EVENT TRIGGERED PIPELINE CONTROL

RELATED APPLICATIONS

This application hereby claims the benefit and priority to U.S. Provisional Patent Application No. 63/345,940, entitled "HARDWARE EVENT TRIGGERED PIPELINE CONTROL," filed May 26, 2022, which is hereby incorporated by reference in its entirety for all purposes.

This application is related to U.S. Application, entitled "DATA PROCESSING PIPELINE," filed herewith on Feb. 27, 2023, which claims the benefit of U.S. Provisional Patent Application No. 63/345,937, entitled "FLEXCONNECT: SUPER PIPELINE," filed May 26, 2022, both of which are hereby incorporated by reference in their entirety for all purposes.

TECHNICAL FIELD

This relates generally to hardware accelerator thread schedulers, and more particularly to hardware accelerator thread schedulers that use hardware events to trigger pipeline control.

BACKGROUND

Hardware accelerator systems are small systems that can be used for specific implementations and accelerate processing for that specific implementation. For example, vision hardware accelerator systems are configured to process image data quickly and efficiently. The hardware accelerator system is an integrated package (IP) within a system on a chip (SOC) or in another example packaged as a SOC, and it may include multiple hardware accelerators (HWAs) that each perform a function, internal memory (e.g., Shared Level 2 (SL2) Random Access Memory (RAM)), Direct Memory Access (DMA) controller and a hardware accelerator thread scheduler (HTS) among other components not discussed for brevity. In hardware accelerator systems, individual HWAs can be connected to form multi-HWA threads that exchange data via local memory. These threads are sequencing of multiple tasks, where individual tasks are executed by various connected components including data transfer tasks. Threads of this type are also called and referred to as pipelines in HWA and HTS. In imaging processing, the threads, or pipelines, are configured to perform tasks on portions of a frame (i.e., subframe). Tasks that operate on and share data for the same subframe can be configured as a single pipeline. The HTS is a simple messaging layer for low-overhead synchronization of the parallel computing tasks and direct memory access (DMA) transfers with external memory and is independent from the host processor of the overall system into which the SoC is integrated. To complete processes, the HTS includes pipeline configurations that define a sequence of tasks that have dependencies in only one direction. The pipelines are enabled by external software executed by the host processor. Every interaction between the SoC and the host processor that occurs is processor intensive to the SoC and to the host processor. Accordingly, enabling pipeline execution using external software is resource intensive.

SUMMARY

Disclosed herein are improvements to pipeline control using hardware event triggers. One general aspect includes a hardware accelerator thread scheduler configured to schedule execution of pipelines, where each pipeline defines a series of tasks performed by one or more hardware accelerators to complete a process, and where a pipeline includes a hardware enable flag configuration setting that allows initiation of the pipeline based on completion of a different pipeline. The hardware accelerator thread scheduler may detect an end of pipeline event indicating completion of the different pipeline, and, in response to the end of pipeline event indicating completion of the different pipeline and the hardware enable flag configuration setting in the pipeline, initiate execution of the pipeline. Other embodiments of this aspect include corresponding computer systems, apparatus, and computer programs recorded on one or more computer storage devices, each configured to perform the actions of the methods.

Implementations may include one or more of the following features. In some embodiments, the end of pipeline event may include a hardware event from one of the hardware accelerators indicating completion of a last task in the series of tasks defined in the different pipeline. In some embodiments, at least one task of the series of tasks of the pipeline may include an instruction to access memory external to a chip housing the hardware accelerator thread scheduler. In some embodiments, the series of tasks for at least one of the pipelines may include tasks to perform image processing. In some embodiments, a third pipeline includes a second hardware enable flag configuration setting that allows initiation of the third pipeline based on completion of the pipeline, where the series of tasks for the first executed pipeline may include tasks for restoring context information for image processing, where the series of tasks for the second executed pipeline may include tasks for performing image processing using the restored context information, and where the series of tasks for the third executed pipeline may include tasks for saving resulting context information after the performing the image processing. The hardware accelerator thread scheduler is further configured to detect a second end of pipeline event indicating completion of the pipeline, and, in response to the second end of pipeline event indicating completion of the pipeline and the second hardware enable flag configuration setting in the third pipeline, initiate execution of the third pipeline. Stated differently, a first pipeline restores context into a memory of the hardware accelerator and is initiated via software. A second pipeline performs image processing for, for example, an image frame, and it is initiated using a hardware enable flag and a trigger based on the end of pipeline event from completion of the first pipeline. A third pipeline saves the context, and it is initiated using a hardware enable flag and a trigger based on the end of pipeline event from completion of the second pipeline. The hardware accelerator thread scheduler may further detect a third end of pipeline event indicating completion of the third pipeline and receive an initiate signal from an external processor to initiate execution of the pipeline again. In some embodiments, each execution of the first, second, and third pipelines performs image processing on a different frame. In some embodiments, each execution of the first, second, and third pipelines performs image processing on the same frame. In some embodiments, each execution of first, second, and third pipelines may be configured with one or many combinations of image processing, data movement, and vision processing tasks. In some embodiments, another pipeline includes a clear pend enable flag configuration setting that allows clearing of a pend block signal in a producer socket of a producer node in the pipeline based on an internal event, selectable through configuration. The hardware accelerator thread scheduler is further configured to detect the internal event, and in response to the internal event and the clear pend enable flag configuration setting, clear the pend block signal in the producer socket. Implementations of the described techniques may include hardware, a method or process, or computer software on a computer-accessible medium.

Another general aspect includes a system that includes a memory, hardware accelerators, and a hardware accelerator thread scheduler. The memory may have stored thereon instructions that, upon execution by one or more processors, cause the one or more processors to send an initiate signal to the hardware accelerator thread scheduler to initiate execution of a first pipeline configured in the hardware thread scheduler. The hardware accelerator thread scheduler may be configured to schedule execution of the pipelines, where each pipeline defines a series of tasks performed by the hardware accelerators, and where a second pipeline includes a hardware enable flag configuration setting that allows initiation of the second pipeline based on completion of the first pipeline. The hardware accelerator thread scheduler may further be configured to receive the initiate signal, and in response to the initiate signal, initiate execution of the first pipeline. The hardware accelerator thread scheduler may further be configured to detect an end of pipeline event indicating completion of the first pipeline, and in response to the end of pipeline event and the hardware enable flag configuration setting in the second pipeline, initiate execution of the second pipeline. Other embodiments of this aspect include corresponding computer systems, apparatus, and computer programs recorded on one or more computer storage devices, each configured to perform the actions of the methods.

Implementations may include one or more of the following features. In some embodiments, the end of pipeline event may include a hardware event from one of the hardware accelerators indicating completion of a last task in the series of tasks defined in the first pipeline. In some embodiments, at least one task of the series of tasks of the first pipeline may include an instruction to access the memory. In some embodiments, the series of tasks for at least one of the pipelines may include tasks to perform image processing. In some embodiments, the system may include a camera for capturing images, and a third pipeline may include a second hardware enable flag configuration setting that allows initiation of the third pipeline based on completion of the second pipeline, where the series of tasks for the first pipeline may include tasks for restoring context information for image processing of images captured by the camera, where the series of tasks for the second pipeline may include tasks for performing the image processing using the restored context information, where the series of tasks for the third pipeline may include tasks for saving resulting context information after the image processing. The hardware accelerator thread scheduler may further be configured to detect a second end of pipeline event indicating completion of the second pipeline, and in response to the second end of pipeline event indicating completion of the second pipeline and the second hardware enable flag configuration setting in the third pipeline, initiate execution of the third pipeline. The hardware accelerator thread scheduler may further be configured to detect a third end of pipeline event indicating completion of the third pipeline, and the hardware accelerator thread scheduler may further be configured to receive an initiate signal from an external processor to initiate execution of the first pipeline. In some embodiments, each execution of the first pipeline, the second pipeline, and the third pipeline performs image processing on a different frame from images captured by the camera. In some embodiments, a third pipeline includes a clear pend enable flag configuration setting that allows clearing of a pend block signal in a producer socket of a producer node in the third pipeline based on an internal event. The hardware accelerator thread scheduler is further configured to detect the internal event, and in response to the internal event and the clear block enable flag configuration setting, clear the pend block signal in the producer socket. Implementations of the described techniques may include hardware, a method or process, or computer software on a computer-accessible medium.

Another general aspect includes a method. The method may be performed by a hardware accelerator thread scheduler that receives a configuration of a first pipeline and a configuration of a second pipeline, where the configuration of the second pipeline includes a hardware enable flag configuration setting that allows initiation of the second pipeline based on completion of the first pipeline. The hardware accelerator thread scheduler may receive an initiate signal for a first pipeline, and in response to the initiate signal, initiate execution of the first pipeline. The hardware accelerator thread scheduler may detect an end of pipeline event indicating completion of the first pipeline, and in response to the end of pipeline event and the hardware enable flag configuration setting, initiate execution of the second pipeline. Other embodiments of this aspect include corresponding computer systems, apparatus, and computer programs recorded on one or more computer storage devices, each configured to perform the actions of the methods.

Implementations may include one or more of the following features. In some embodiments, the end of pipeline event may include a hardware event from a hardware accelerator indicating completion of a last task in a series of tasks defined in the first pipeline. In some embodiments, at least one task of a series of tasks of the first pipeline may include an instruction to access memory external to a chip housing the hardware accelerator thread scheduler. In some embodiments, a series of tasks defined by the first pipeline may include tasks for restoring context information for image processing, a series of tasks defined by the second pipeline may include tasks for performing image processing using the restored context information, and a series of tasks defined by the third pipeline may include tasks for saving resulting context information after the image processing. The hardware accelerator thread scheduler may detect a second end of pipeline event indicating completion of the second pipeline, and in response to the second end of pipeline event indicating completion of the second pipeline and the second hardware enable flag configuration setting in the third pipeline, initiate execution of the third pipeline. The hardware accelerator thread scheduler may detect a third end of pipeline event indicating completion of the third pipeline and receive an initiate signal from an external processor to initiate execution of the first pipeline. In some embodiments, the hardware accelerator thread scheduler may receive a configuration of a third pipeline that includes a clear block enable flag configuration setting that allows clearing of a producer socket based on a consumer socket completing access to data from the producer socket. The hardware accelerator thread scheduler may detect a complete event indicating the consumer socket completed access to data from the producer socket, and in response to the complete event and the clear block enable flag configuration setting, clear a pend block status of the producer socket. In some embodiment, the hardware accelerator thread scheduler may detect any other defined internal event and subsequent action may be implemented specific to that event. Implementations of the described techniques may include hardware, a method or process, or computer software on a computer-accessible medium.

This Summary is provided to introduce a selection of concepts in a simplified form that are further described below in the Detailed Description. It may be understood that this Summary is not intended to identify key features or essential features of the claimed subject matter, nor is it intended to be used to limit the scope of the claimed subject matter.

BRIEF DESCRIPTION OF THE DRAWINGS

FIG. 4 illustrates exemplary data structures for configuring hardware event triggered pipeline control, according to some embodiments.

The drawings are not necessarily drawn to scale. In the drawings, like reference numerals designate corresponding parts throughout the several views. In some embodiments, components or operations may be separated into different blocks or may be combined into a single block.

DETAILED DESCRIPTION

Discussed herein are enhanced components, techniques, and systems related to hardware event triggered pipeline control. Specifically, a hardware accelerator thread scheduler (HTS) can initiate pipelines based on hardware events in the hardware accelerator system.

In imaging processing, pipelines are configured to perform tasks on portions of a frame (i.e., subframes). As discussed herein, a pipeline is a sequence of tasks which have dependencies in only one direction, and each node in the pipeline can activate its successor. Tasks that operate on and share data for the subframe can be configured as a single pipeline. For example, a pipeline may process a number of lines of the frame at a time. As an example, a pipeline may process four lines of a frame at a time, and when the entire frame is processed, the pipeline is complete, and a hardware end of pipeline event occurs. Tasks that operate on different subframes are separated into different pipelines.

The HTS can define hardware events for triggering pipeline control (e.g., starting the pipeline) and configure the pipelines to allow the pipeline control. Within the configuration of the pipeline, the hardware enable flag is toggled on or off, and the hardware events that indicate the triggering event and the pipeline control that is triggered by the event are set. Based on the configuration, when the hardware event occurs, the HTS can initiate the pipeline control in response. For example, if a pipeline is configured such that the hardware enable flag is toggled on, an end of pipeline event of another pipeline is the configured event, and the pipeline control is to start the pipeline, when the other pipeline end of pipeline event is signaled, the HTS initiates the pipeline in response. Therefore, rather than a host processor executing an instruction from software stored on a host memory to initiate pipelines in a hardware accelerator system, a hardware event triggers the HTS to initiate execution without interference from the host processor.

Additional features may include the HTS configuring a super pipeline with an automatic pend block status clear flag and the hardware event that triggers clearing the pend block signal from the producer node of the pipeline that ended at the pipeline threshold. Therefore, rather than a host processor executing an instruction from software stored on a host memory to clear the pend block signal, a hardware event triggers the HTS to clear the pend block signal so the super pipeline execution can continue.

These enhancements substantially improve the speed at which the accelerator systems perform. Removing the interactions between the host system and the accelerator system also reduces processor cycles of the host processor and memory usage of the host system. Substantial performance improvements are discussed with respect to FIG. 6.

Figure 1:
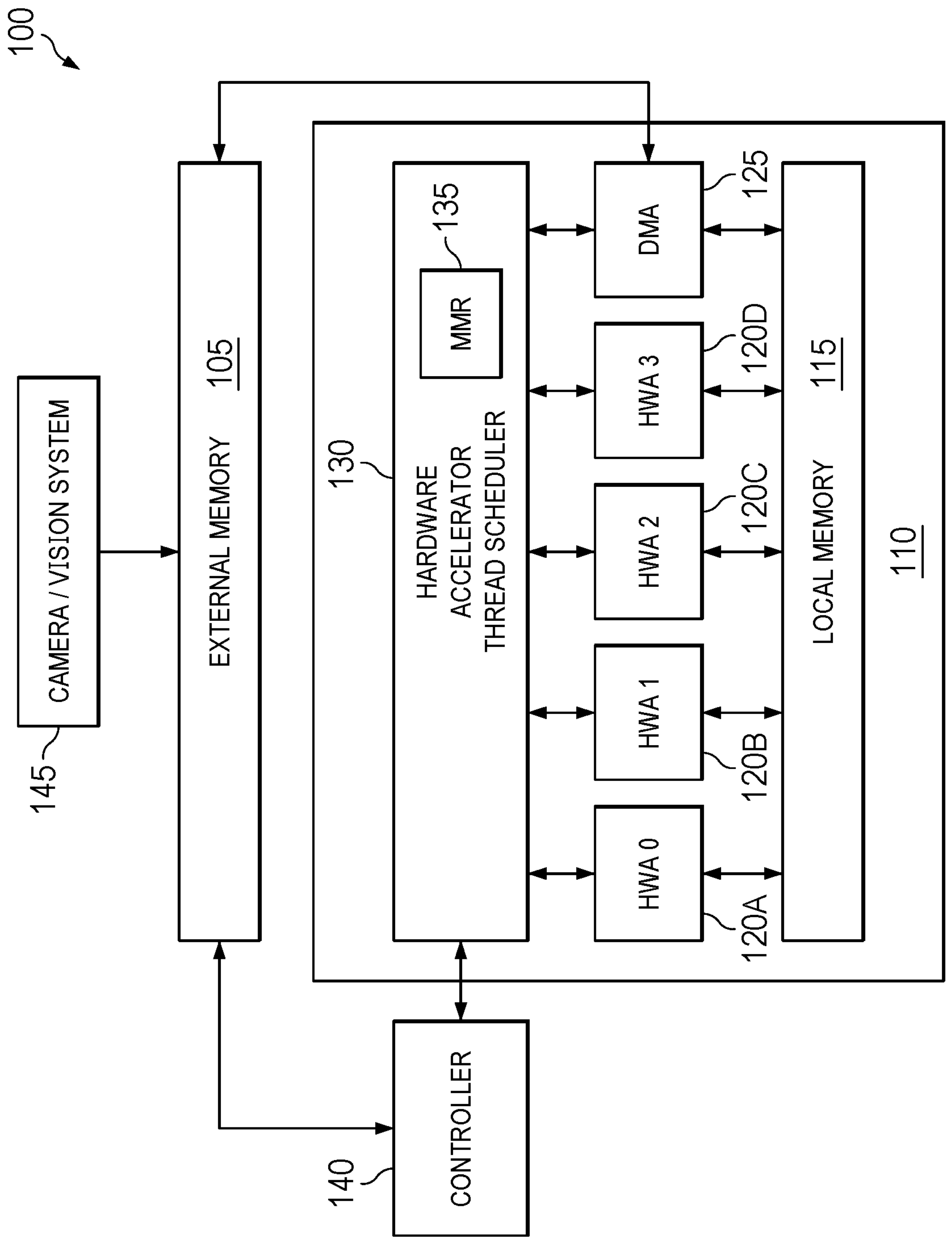
FIG. 1 illustrates an exemplary system for implementing hardware event triggered pipeline control, according to some embodiments.

Turning to the figures, FIG. 1 illustrates an example system 100 that implements hardware event triggered pipeline control. System 100 includes external memory 105, hardware acceleration system 110, controller 140, and vision system 145. System 100 may include other components not discussed here for brevity. System 100 may be, for example, a vehicle with a vision system 145 or any other system that includes a hardware acceleration system 110.

External memory 105 may be a memory (e.g., host memory) used in the overall system 100. External memory 105 may be any memory that can be accessed by a controller such as controller 140 or any other processing circuitry (e.g., a host processor). External memory 105 may include any type of memory such as volatile and nonvolatile, removable and non-removable memory implemented in any method or technology for storage of information, such as computer readable instructions, data structures, program modules, or other data. Examples of memory include random RAM, ROM, programmable ROM, erasable programmable ROM, electronically erasable programmable ROM, solid-state drives, magnetic disks, optical disks, optical media, flash memory, virtual memory and non-virtual memory, magnetic cassettes, magnetic tape, magnetic disk storage or other magnetic storage devices, or any other suitable storage media. In no case is external memory 105 a propagated signal (e.g., a transitory signal). External memory 105 may store software or other instructions executed by controller 140 for performing functions including those described herein.

Vision system 145 may be any vision system that includes a camera and may include sensors, multiple cameras, and the like for capturing images that may be processed by hardware acceleration system 110. The discussion herein uses vision as an example, but any kind of data can be processed by hardware acceleration system 110, and therefore vision system 145 may be any type of system that captures or otherwise processes data for analysis by hardware acceleration system 110.

Controller 140 may be processing circuitry used in system 100 to execute instructions. Controller 140 may be a host controller/processor that performs functions used throughout system 100. Controller 140 may further be a direct memory access (DMA) controller 140 that is configured to facilitate data transfer between local memory 115 and external memory 105. In some embodiments, a separate DMA controller may be included rather than included in controller 140. External DMA requests are either at the beginning of pipeline or end of pipeline. The functionalities are mapped using consumer and producer nodes.

Hardware acceleration system 110 may be an embedded system in some embodiments and may be packaged as a System on a Chip (SoC). Hardware acceleration system 110 may include local memory 115, hardware accelerators (HWAs) 120A-D, direct memory access (DMA) node 125, and hardware accelerator thread scheduler (HTS) 130. Hardware acceleration system 110 may include more or fewer components in some embodiments without departing from the spirit of this disclosure.

Local memory 115 may be a memory stored in hardware acceleration system 110 that is specific to hardware acceleration system 110. Local memory 115 may include any type of memory such as volatile and nonvolatile, removable and non-removable memory implemented in any method or technology for storage of information, such as computer readable instructions, data structures, program modules, memory, or other data. Examples of memory include random access memory (RAM) (e.g., SL2 RAM), read only memory (ROM), programmable ROM, erasable programmable ROM, electronically erasable programmable ROM, solid-state drives, magnetic disks, optical disks, optical media, flash memory, virtual memory and non-virtual memory, magnetic cassettes, magnetic tape, magnetic disk storage or other magnetic storage devices, or any other suitable storage media. In no case is local memory 115 a propagated signal. Local memory 115 may be a fast access memory for hardware accelerators 120A-D because it is dedicated memory for hardware acceleration system 110. Further, local memory 115 may be physically close to hardware accelerators 120A-D, which also may speed access time. Local memory 115 may be used as shared memory for the hardware acceleration system 110. Data that is needed for use by hardware accelerators 120A-D may be accessed by controller 140 from external memory 105 and stored in local memory 115. Local memory 115 may be sized based on use cases for the hardware acceleration system 110 and area constraints. For example, local memory 115 may be fixed at 512 KB to support 8 MP image processing, Global and Local Brightness Contrast Enhancement (GLBCE) context storage, lens distortion correction (LDC) superblock support for each block up to, for example, 128×64, multi-scalar engine (MSC), and Noise Filter (NF) operations, in some embodiments. In other examples, local memory 115 may be any other size to support desired functionality and features. Local memory 115 may store other data that is not included here for ease of description. In some embodiments, local memory 115 may be placed outside hardware acceleration system 110 but within a system on a chip (SOC). In some embodiments, storage needs of local memory 115 may also be covered by external memory 105, though it may not be intended for performance reasons, but may be useful for storage reasons. In general, local memory 115 may be any type of general memory.

Hardware accelerators 120A-D may each be a node that performs one task. As used herein, a node is a HWA (HWAs 120A-D, DMA node 125, or a channel of DMA node 125) or a proxy to DMA/external thread management. If a HWA (e.g., any of HWAs 120A-D) utilizes input data from multiple tasks, those tasks are independently handled from each other. A node can start a task on any other node. As used herein, a task is a certain function that runs on a node. For example, hardware accelerator 120A may convert raw image sensor data into processed RGB (red, green, blue) or YUV (luma, chroma) images. Hardware accelerator 120B may perform lens distortion correction. Hardware accelerator 120C may perform noise filtering operations. Hardware accelerator 120D may perform multi-scalar operations. These functions are one example of hardware accelerators 120A-D that may be included in hardware acceleration system 110 for use with a vision system 145. However, the examples are not intended to limit this disclosure to vision and image processing. Further, while four hardware accelerators 120A-D are shown, any number of hardware accelerators may be included in hardware acceleration system 110. HWAs 120A-D can be connected to form multi-HWA threads (i.e., pipelines) that exchange data via local memory 115. In some embodiments, HWAs 120A-D may be designed to support additional use cases that may arise.

DMA node 125 may be a node that performs memory access operations as a task performed within a pipeline. DMA node 125 may be used for Input/Output (I/O) buffer transfer. DMA nodes 125 are tightly coupled to HWAs 120A-D in either producer or consumer mode. DMA node 125 may be single channel or multi-channel. For example, DMA node 125 may have sixty-four (64) channels. In that example, DMA node 125 may operate as though it is sixty-four (64) independent DMA nodes because each channel may independently perform specific DMA functions. A channel of DMA node 125 may perform memory access operations to access, for example, image data (e.g., pixel data and/or frame data) from external memory 105 that is stored by, for example, camera/vision system 145. While image data used for image processing by hardware acceleration system 110 may be obtained using a channel of DMA node 125, in some embodiments, a HWA (e.g., any of HWAs 120A-D) may directly access image data from camera/vision system 145.

Hardware Accelerator Thread Scheduler (HTS) 130 may be a hardware component in hardware acceleration system 110 that provides scheduling functionality to HWAs 120A-D and DMA node 125 and channel mapping functionality to DMA node 125. HTS 130 is a messaging layer for low-overhead synchronization of the parallel computing tasks and DMA transfers and is independent from any host processors (e.g., controller 140) of system 100 during processing of a pipeline, however the host processors (e.g., controller 140) provide configuration at the frame level for the HTS 130. In the example of a vision implementation, HTS 130 allows autonomous frame level processing of the hardware acceleration system 110 subsystem. HTS 130 defines various aspects of synchronization and data sharing between HWAs 120A-D. Using producer and consumer dependencies, HTS 130 ensures that a task starts only when input data and adequate space to write out data is available in local memory 115. HTS 130 further implements pipe-up, debug, and abort for HWAs 120A-D. HTS 130 further controls power consumption by generating active clock window for HWA 120A-D clocks when no task is scheduled. HTS 130 implements a memory mapped register (MMR) 135 that configures scheduling activities for HWAs 120A-D and DMA node 125. Specifically, MMR 135 configures the pipelines for execution by HTS 130 using HWAs 120A-D and DMA node 125. For example, the pipeline configurations may include the set of tasks that are to be performed by various HWAs 120A-D and various channels of DMA node 125 for each pipeline. MMR 135 can configure a pipeline where tasks can run in parallel on the same data (e.g., divergence or convergence). A task can have multiple producer nodes. The data produced from a task can have multiple consumer nodes. HTS 130 may be configured to manage scheduling the tasks within the pipelines during execution. HTS 130 may be further configured to manage control of direct memory access (DMA) channels of DMA node 125 that allow memory reads and writes between local memory 115 and external memory 105 based on configurations received from controller 140. The synchronization of tasks follows some basic rules in the examples described. Tasks are activated remotely by a respective HTS, and the respective HTS indicates the end of the task when complete. Indications regarding the end of the task are sent to relevant nodes and are used for next task initiation in the pipeline. The hardware acceleration system 110 includes a configuration port that software can use to directly setup nodes. Tasks are triggered in a pipeline based on one or more conditions. The conditions to activate a task remain static during an operation. Dedicated activation events for DMA nodes are not broadcasted, and activation events for HWAs 120A-D are broadcasted. The notification to activate a task (tstart) can occur after all data for the task is available in local memory 115, which is the responsibility of the predecessor task.

Tasks running on individual HWAs 120A-D may share output to another HWA 120A-D without going through frame level storage (for example external memory 105), and thus the HWAs can be connected in a single pipeline (i.e., functional thread) in a variety of different orders and configurations on the fly. Partial data produced locally (for example in local memory 115) by one HWA (e.g., HWA1 120B) can be read by another HWA (e.g., HWA2 120C) to produce the same output as if the second HWA (e.g., HWA2 120C) started processing only after full frame data is produced by the first HWA (e.g., HWA1 120B) and stored into frame storage (for example external memory 105) by DMA node 125, and these tasks can be connected in a single pipeline. In some cases, the HWA 120A-D share partial data generated out of frame processing. In some examples, the frequency of repetition is the same for HWA1 120B and HWA2 120C to be able to connect in a single pipeline (e.g., HWA1 120B acts on one frame and HWA2 120C also acts on one frame). In some examples, two pipelines are used when, for example, HWA1 120B acts on one frame but HWA2 120C processes the same output frame twice, so that HWA1 120B tasks are a first pipeline and HWA2 120C tasks are a second pipeline. In some examples, two pipelines are used when, for example, HWA1 120B acts on one frame and HWA2 120C processes the same output frame or frame level data derived from the image but with a different frequency or hard-to-find sharable sub-frame options such that HWA1 120B tasks are a first pipeline and HWA2 120C tasks are a second pipeline.

When connected, HWAs 120A-D can share partial data (e.g., subframe data) locally (e.g., in local memory 115) the tasks may be in the same pipeline. When sharing of data happens at the frame level, separate pipelines may be used and individual pipeline configuration, including when to initiate the pipeline, may be handled by controller 140.

MMR 135 is a memory mapped register that controls configuration of the pipelines for execution by HTS 130. The configuration settings for a pipeline control how HTS 130 schedules the tasks performed during execution of the pipeline. HTS 130 and MMR 135 are configured to recognize hardware events triggered by HWAs 120A-D and DMA node 125 and schedule execution of additional tasks based on the hardware events.

In previous technologies, pipelines were enabled (i.e., started or initiated) by a software instruction that HTS 130 received from controller 140, and hardware triggering to initiate a pipeline was not available. Every transaction between HTS 130 and controller 140 expends resources. For example, the configuration of a first pipeline may restore context information used by a second pipeline. In that example, configuration of the first pipeline may include execution of a task by a first channel of DMA node 125 to access the context data and place it into a location (e.g., a buffer within local memory 115) accessible by the second pipeline. The second pipeline may perform image processing on image data using the context data (e.g., statistical information from previous frame operations) obtained by the first pipeline. Therefore, the second pipeline may include execution of tasks by HWAs 120A-D to access and process the image data using image processing parameters as well as the context data. A third pipeline may save the context data to another memory location (e.g., external memory 105). Accordingly, the third pipeline may include execution of a task by a second channel of DMA node 125 to store the context data. For ease of description, each pipeline is described as having tasks performed by a single HWA (any of HWAs 120A-D) or channel of DMA node 125, but any pipeline may include tasks performed by any number of HWAs 120A-D and/or channels of DMA node 125. Accordingly, each of the first, second, and third pipelines must be initiated, and in some alternative systems, each pipeline would be initiated by an instruction from controller 140, which expends substantial resources.

Advantageously, HTS 130 and MMR 135 are configured to allow hardware triggered enabling and initiation of pipelines. MMR 135 may configure the second pipeline to enable hardware triggering, and MMR 135 may configure the hardware trigger to initiate the second pipeline. For example, MMR 135 may configure initiating the second pipeline based on an end of pipeline event indicating the first pipeline is complete. Similarly, MMR 135 may configure the third pipeline to enable hardware triggering, and configure the third pipeline to initiate based on an end of pipeline event from the second pipeline. These hardware triggering events that initiate the subsequent pipeline remove the resource intensive requirement of the software to trigger those pipelines, saving substantial resources within the hardware acceleration system 110.

Figure 3:
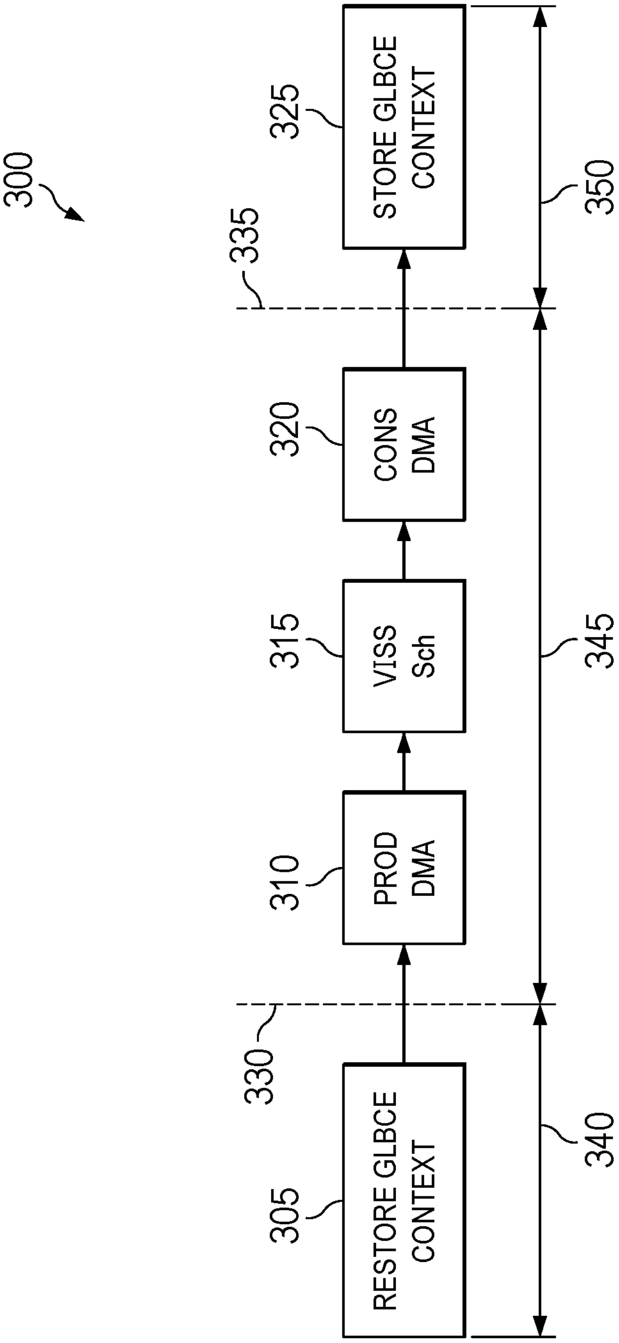
FIG. 3 illustrates exemplary pipeline flow, according to some embodiments.

Accordingly, to resolve the software initiation of pipelines and using the example above, MMR 135 can configure the end of the first pipeline to trigger the initiation of the second pipeline and the end of the second pipeline to trigger the initiation of the third pipeline. Therefore, the first pipeline may restore context information used by the second pipeline, the second pipeline may perform image processing using the context data obtained by the first pipeline, and the third pipeline may save the context data to another memory location without interference by the controller 140. FIG. 3 and the accompanying description describe an example of hardware triggering configuration in more detail.

In some examples, a pipeline cycles through the start of image processing (e.g., for one frame) until it completes the image processing associated tasks assigned to each HWA 120A-D and writes out the final result using a channel of DMA node 125 as configured in the pipeline. At the end of the pipeline, the next frame image processing may be automatically started with less or no intervention from the processor because the end of pipeline event may be the trigger to begin the next pipeline to start the processing of the next frame using a hardware trigger. If no further frames are available, the hardware acceleration system 110 may enter an IDLE state awaiting set up by controller 140 for the next thread execution.

Throughout this description, examples are used including a configured event of an end of pipeline event triggering pipeline control to start a second pipeline. However, any hardware event may be the configured event, and any pipeline control configuration can be the event that is triggered. Further, while image processing is used in the examples, any type of hardware acceleration processing can use the techniques described herein without departing from the scope of the description.

Figure 2:
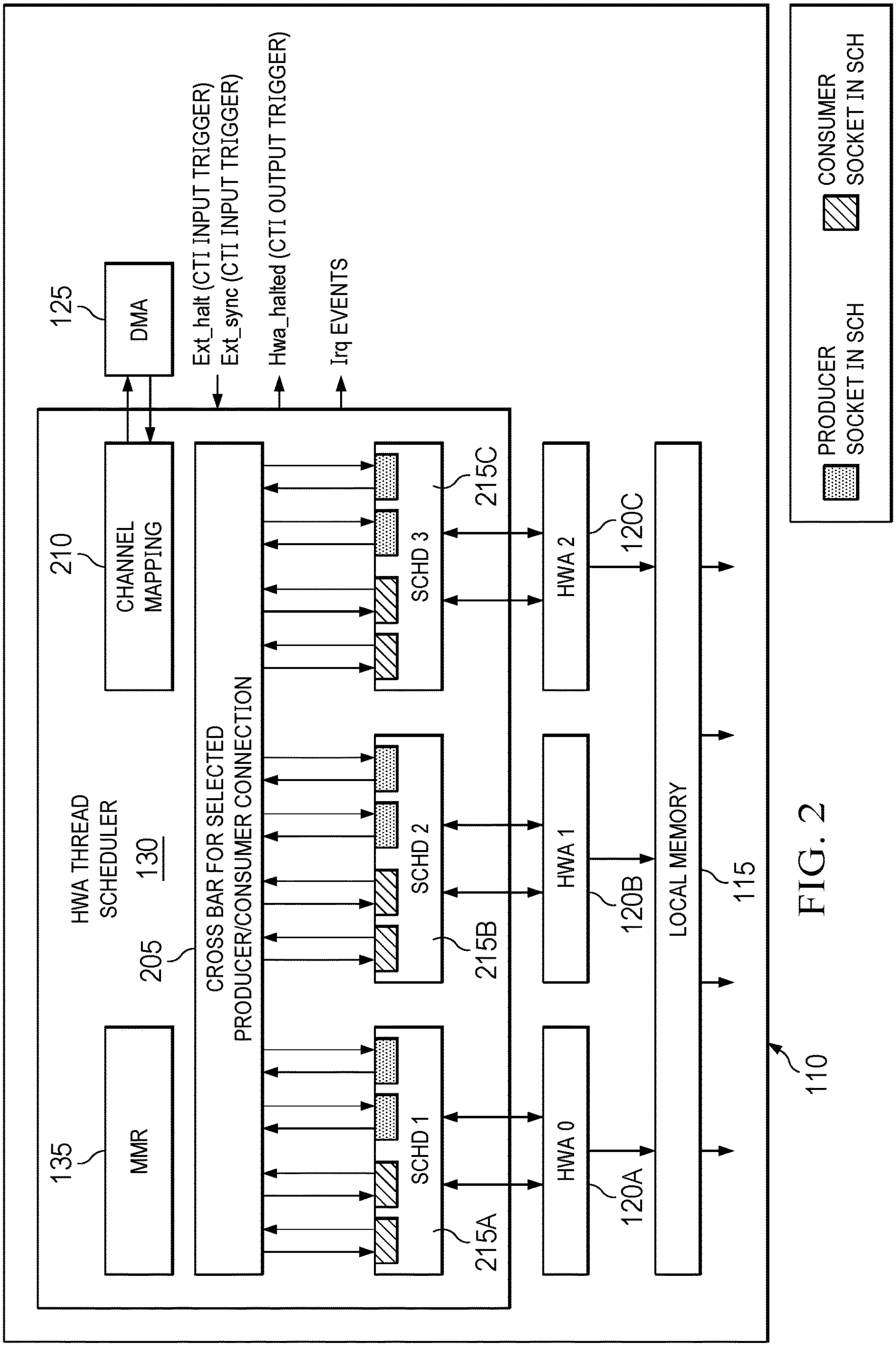
FIG. 2 illustrates an exemplary System on a Chip (SoC) for implementing hardware event triggered pipeline control, according to some embodiments.

FIG. 2 illustrates a more detailed view of hardware acceleration system 110. Hardware acceleration system 110 includes HTS 130, HWAs 120A-C, DMA node 125, and local memory 115 as previously described with respect to FIG. 1. HTS 130 further includes MMR 135 as described with respect to FIG. 1. HTS 130 additionally includes cross bar 205, schedulers 215A-C, and channel mapping 210.

Cross bar 205 interacts with schedulers 215A-C by carrying signals between the schedulers 215A-C to coordinate activity for each HWA 120A-C. Each HWA 120A-C has a corresponding scheduler 215A-C. For example, HWA 120A is coupled with scheduler 215A, HWA 120B is coupled with scheduler 215B, and HWA 120C is coupled with scheduler 215C. The cross bar 205 interacts with consumer sockets and producer sockets in each scheduler 215A-C that indicate status information for each HWA 120A-C when acting as a producer node and consumer node. A node having at least one active consumer socket is called a consumer node, and a node having at least one active producer socket is called a producer node. A producer node (i.e., any of HWA 120A-C acting as a producer) generates a pend block signal indicating availability of consumable data. A consumer node (i.e., any of HWA 120A-C acting as a consumer) generates a dec signal indicating consumption of produced data. Multiple producer sockets and consumer sockets in each scheduler allow multiple threads of activity at a given time. HWAs 120A-C act as consumers for data needed to perform its task and a producer for data generated by the task. The schedulers 215A-C may be implemented in hardware that can provide signals to and receive signals from HWAs 120A-C. Schedulers 215A-C can trigger an initialize event to initialize the respective HWA 120A-C and can trigger a tstart event that indicates to the respective HWA 120A-C to execute the task. On completion of the task, the respective HWA 120A-C triggers an event that indicates the task execution is complete. If the task is a last task for a pipeline, the respective HWA 120A-C can trigger an end of pipeline event that is detected by the scheduler. Cross bar 205 can provide communication between HWAs 120A-C by ensuring that producer sockets are complete before initiating the corresponding consumers.

While not shown, spare schedulers that are not associated with a particular HWA may be included to help with handling messages with the external host controller 140, undefined external/internal synchronization, handling data writes, and the like.

Channel mapping 210 provides mapping to the correct HWA 120A-C for memory access to external memory 105. Data transfer between local memory 115 and external memory 105 is handled by a DMA engine and DMA node 125. All controller intervention are either at beginning of pipeline or end of pipeline. These functionalities are mapped using consumer and producer nodes.

FIG. 3 illustrates an example of a series of pipelines 300 that can be hardware trigger enabled to improve performance of system 100. The series of pipelines 300 includes a first pipeline 340, a second pipeline 345, and a third pipeline 350. The first pipeline 340 may include a task 305 performed by a HWA (e.g., a first channel of DMA node 125) for restoring context information for use with the second pipeline 345. For example, the context information may be GLBCE context information based previous image data of a camera that captured the current image data that will be analyzed with the second pipeline 345. The second pipeline 345 processes a frame by loading a few lines at a time in task 310, processing the lines at task 315, and storing the processed lines at task 320 and repeating these tasks 310, 315, and 320 until the entire frame is processed. More specifically, the second pipeline 345 may include a task 310 that is a DMA task for obtaining the image data for processing. A DMA node (e.g., a second channel of DMA node 125) may obtain a few lines of the image data from external memory (e.g., external memory 105) and store the lines of image data in local memory (e.g., local memory 115). The second pipeline 345 may include a task 315 that is an image analysis task. The image analysis task can be full image processing or any portion of image processing without limitation including, for example, filtering, distortion correction, scaling, and the like. An image analysis HWA (e.g., HWA 120A) may execute analysis of the lines of image data stored in the local memory using the context data obtained by the first pipeline 340. The second pipeline 345 may include another task 320, which may be a DMA task for producing the processed image data. A DMA node (e.g., a third channel of DMA node 125) may store the processed image data in, for example, external memory or local memory for use by a next layer of image processing. The DMA node may store the processed image data in, as another example, external memory for use by an external program or another pipeline. Note that the second pipeline 345 may process image data at a subframe level (e.g., a number of lines of the frame at a time), and the end of pipeline event may occur only when the entire frame is processed. The third pipeline 350 may include a task 325 performed by a HWA (e.g., a fourth channel of DMA node 125) for storing the context information, which may be needed at a later time for processing frames from, for example, the same camera. In some embodiments, the context information may have changed (e.g., updated) during the image processing performed by the second pipeline 345.

At the threshold 330 is an end of the first pipeline 340 and start of the second pipeline 345. At the threshold 335 is an end of the second pipeline 345 and start of the third pipeline 350. At thresholds 330 and 335, in previous systems, an external controller executes instructions stored in external memory that cause the HTS to initiate the second pipeline 345 and the third pipeline 350. In system 100, the second pipeline 345 is configured to enable hardware trigger initiation based on an end of pipeline event indicating the first pipeline 340 is complete, and the third pipeline 350 is configured to enable hardware trigger initiation based on an end of pipeline event indicating the second pipeline 345 is complete.

Based on the configuration of the second pipeline 345, the HTS can initiate the second pipeline 345 when the HTS detects the end of pipeline event for the first pipeline 340. Based on the configuration of the third pipeline 350, the HTS can initiate the third pipeline 350 when the HTS detects the end of pipeline event for the second pipeline 345. Accordingly, at thresholds 330 and 335, use of host processing and memory is not needed, improving the overall system performance. While the end of pipeline event is used as an example of an event that is configured for triggering the start of another pipeline, any event (not just end of pipeline) can be used to trigger the next action, and the next action can be any action (not just starting another pipeline).

FIG. 4 illustrates example event definitions 400 for implementing the hardware event trigger pipeline control described herein. The example event definitions 400 are provided as exemplary information, but implementation of hardware triggering events and configurations may differ without departing from the scope of this disclosure.

Table 405 provides example information for the HTS (e.g., HTS 130) changes that are used to implement the hardware event trigger pipeline control. In the example shown, eight (8) local HTS events are defined. The MMR (e.g., MMR 135) defines sources of the local events. To define an event, for example using the information shown in table 405, the MMR configures one of the local HTS events (hts_event) of width 34 out of "3'b0,pipeline_eop[6:0], 1'b0,start_frame_evt,2'b0,hwa_eop[8:0],2'b0,hwa_init[8:0]". Further, hts_event[0 . . . 7]=hts_event[hts_event_gen[0 . . . 7].evt_select].

Table 410 provides example information for MMR changes for configuration of the pipelines. Bit 1 can enable the hardware triggering (hw_en), and bits 2-4 provide the selected hardware event that triggers initiation. Accordingly, if the hardware triggering bit (i.e., hardware enable flag) is not set for a pipeline configuration, the pipeline cannot be triggered by hardware events. As an example, to configure pipeline 1 to trigger based on end of a pipeline 0 (pipeline_eop[0]), the following MMR configuration setting is used: Hw_en_evtselect=0, HTS_EVENT_GEN[0].evt_select=24.

Table 415 provides example information for clearing a pend block signal at a pipeline threshold in a super pipeline. Super pipelines are pipelines chained together for sequential execution according to a specific configuration. However, a pend block signal indicating availability of consumable data at a producer socket in a pipeline halts execution of the next pipeline at the pipeline boundary until the pend block signal is cleared. The MMR configuration settings for the super pipeline can enable a hardware trigger to clear the pend block signal. For example, at a pipeline boundary (threshold), the MMR can configure the finishing pipeline to enable an automatic clear of the producer socket pend block signal based on a hardware event. The MMR can configure the hardware event that triggers the automatic clear of the pend block signal based on, for example, detection of the dec signal indicating consumption of the produced data by the consumer node.

Figure 5:
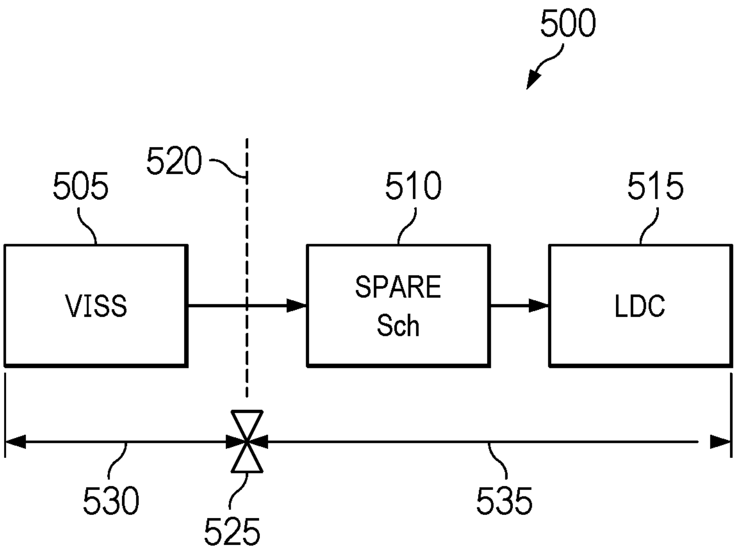
FIG. 5 illustrates an exemplary super-pipeline flow, according to some embodiments.

FIG. 5 illustrates a super pipeline 500. The super pipeline 500 includes a first pipeline 530 and a second pipeline 535. The first pipeline 530 includes a task 505 that may be performed by a HWA (e.g., HWA 120A). The second pipeline 535 may include a task 510 that is performed by a different HWA (e.g., HWA 120B with DMA node capability), and another task 515 that is performed by another HWA (e.g., HWA 120C). For example, HWA 120A may perform image analysis as task 505, HWA 120B may perform data transfer to move the analyzed image from an output buffer of HWA 120A to an input buffer of HWA 120C or any other storage accessible by HWA 120C as task 510. HWA 120C may perform lens distortion correction on the analyzed image as task 515. At threshold 520, a pend block signal 525 is configured to ensure the producer socket of the HWA performing task 505 is cleared before the second pipeline 535 can be scheduled for execution by the HTS. The configuration described with respect to table 415 can be used to automatically clear the pend block signal 525 of the producer socket for the HWA performing task 505 based on a hardware event. Accordingly, the MMR may configure the first pipeline 530 to enable automatically clearing the pend block signal 525 based on a local hardware event. In this example, the MMR may configure an HTS event indicating the end of the second pipeline 535 followed by initialization completion of pipeline 535 and use this HTS event as the trigger that clears the pend block signal 525.

Figure 6:
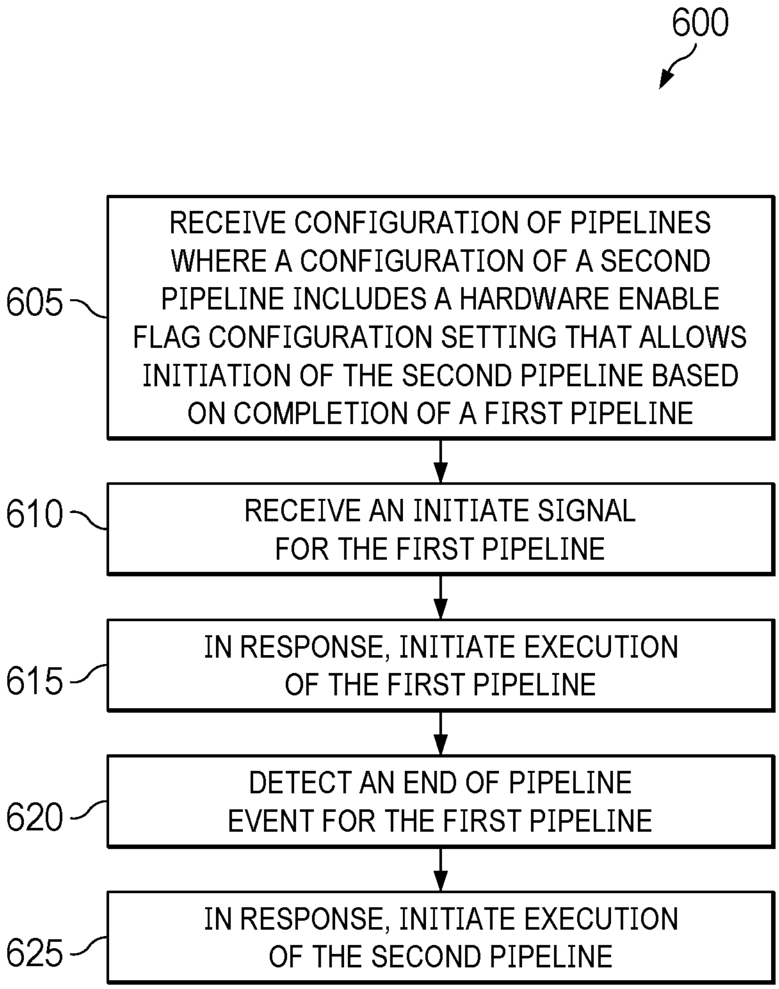
FIG. 6 illustrates an exemplary method for implementing hardware event triggered pipeline control, according to some embodiments.

FIG. 6 illustrates a method 600 for implementing hardware event triggered pipeline control. Method 600 may be performed by a hardware acceleration system (e.g., hardware acceleration system 110) and more specifically by a HTS (e.g., HTS 130). Method 600 begins at step 605. The HTS receives configuration of pipelines. For example, the MMR (e.g., MMR 135) may store the configuration of the pipelines. The configuration of a second pipeline may include a hardware enable flag configuration setting that allows initiation of the second pipeline based on completion of a first pipeline. As described with respect to table 410, the MMR sets the hardware enable flag for the second pipeline and configures the end of pipeline event indicating the first pipeline is complete as the hardware event to trigger execution of the second pipeline.

At step 610, the HTS receives an initiate signal for the first pipeline. For example, controller 140 may instruct HTS to schedule execution of the first pipeline. At step 615, in response to receiving the initiate signal, the HTS initiates execution of the first pipeline.

When the first pipeline completes execution, the HWA executing the last task triggers an end of pipeline event. The HTS detects the end of pipeline event indicating an end of the first pipeline at step 620. At step 625, in response to detecting the end of pipeline event and the configuration of the second pipeline, the HTS initiates execution of the second pipeline. Advantageously, at step 625, there is no software intervention from the host processor to initiate execution of the second pipeline. Rather, the hardware event indicating the end of the first pipeline triggers the second pipeline initiation.

While some examples provided herein are described in the context of a vehicle or vision subsystem, peripheral, architecture, or environment, it should be understood that the subsystems and other systems and methods described herein are not limited to such embodiments and may apply to a variety of other processes, systems, applications, devices, and the like. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein,"

"above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A circuit comprising:
- a set of hardware accelerators each configured to perform a respective task;
- a hardware accelerator thread scheduler coupled to the set of hardware accelerators, wherein:
  - the hardware accelerator thread scheduler comprises a register;
  - the register stores configuration settings for a plurality of pipelines, the configuration settings including a hardware enable flag and an event selection configuration that identifies a hardware trigger for initiating the respective pipeline;
  - for a first pipeline of the plurality of pipelines, the hardware enable flag is enabled and the event selection configuration is an end of pipeline hardware event of a second pipeline; and
  - the hardware accelerator thread scheduler is configured to:
    - schedule execution of the plurality of pipelines, wherein each pipeline of the plurality of pipelines defines a series of tasks performed by one or more hardware accelerators of the set of hardware accelerators to complete a process;
    - detect the end of pipeline hardware event of the second pipeline; and
    - in response to the end of pipeline hardware event of the second pipeline and the configuration settings of the first pipeline, initiate execution of the first pipeline.

2. The circuit of claim 1, wherein the end of pipeline hardware event comprises a hardware event from one of the one or more hardware accelerators indicating completion of a last task in the series of tasks defined in the second pipeline.

3. The circuit of claim 1, wherein at least one task of the series of tasks of the first pipeline comprises an instruction to access memory external to a chip comprising the hardware accelerator thread scheduler.

4. The circuit of claim 1, wherein the series of tasks for at least one of the plurality of pipelines comprises tasks to perform image processing.

5. The circuit of claim 1, wherein:
- for a third pipeline of the plurality of pipelines, the hardware enable flag is enabled and the event selection configuration is an end of pipeline hardware event of the first pipeline,
- the series of tasks for the second pipeline comprises tasks for restoring context information for image processing,
- the series of tasks for the first pipeline comprises tasks for performing image processing using the restored context information, the series of tasks for the third pipeline comprises tasks for saving resulting context information after the performing the image processing, and the hardware accelerator thread scheduler is further configured to:

detect the end of pipeline hardware event of the first pipeline;

in response to the end of pipeline hardware event of the first pipeline and the configuration settings of the third pipeline, initiate execution of the third pipeline;

detect the end of pipeline hardware event of the third pipeline; and receive an initiate signal from an external processor to initiate execution of the second pipeline.

6. The circuit of claim 5, wherein each execution of the second pipeline, the first pipeline, and the third pipeline performs image processing on a different frame.

7. The circuit of claim 1, wherein:

for a third pipeline of the plurality of pipelines, the configuration settings include a clear pend enable flag that allows clearing of a pend block signal in a producer socket of a producer node in the third pipeline based on an internal event; and the hardware accelerator thread scheduler is further configured to:

detect the internal event, and in response to the internal event and the clear pend enable flag, clear the pend block signal in the producer socket.

8. A system, comprising:

one or more processors configured to:

send an initiate signal to a hardware accelerator thread scheduler to initiate execution of a first pipeline of a plurality of pipelines configured in the hardware accelerator thread scheduler;

one or more hardware accelerators; and the hardware accelerator thread scheduler comprising a register, wherein:

the register stores configuration settings for the plurality of pipelines, the configuration settings including a hardware enable flag and an event selection configuration that identifies a hardware trigger for initiating the respective pipeline, for a second pipeline of the plurality of pipelines, the hardware enable flag is enabled and the event selection configuration is an end of pipeline hardware event of the first pipeline, and the hardware accelerator thread scheduler is configured to:

schedule execution of the plurality of pipelines, wherein each pipeline of the plurality of pipelines defines a series of tasks performed by the one or more hardware accelerators, receive the initiate signal, in response to the initiate signal, initiate execution of the first pipeline, detect the end of pipeline hardware event of the first pipeline, and in response to the end of pipeline hardware event of the first pipeline and the configuration settings of the second pipeline, initiate execution of the second pipeline.

9. The system of claim 8, wherein the end of pipeline hardware event comprises a hardware event from one of the one or more hardware accelerators indicating completion of a last task in the series of tasks defined in the first pipeline.

10. The system of claim 8, wherein at least one task of the series of tasks of the first pipeline comprises an instruction to access memory.

11. The system of claim 8, wherein the series of tasks for at least one of the plurality of pipelines comprises tasks to perform image processing.

12. The system of claim 8, further comprising:

a camera for capturing images.

13. The system of claim 12, wherein:

for a third pipeline of the plurality of pipelines, the hardware enable flag is enabled and the event selection configuration is an end of pipeline hardware event of the second pipeline, the series of tasks for the first pipeline comprises tasks for restoring context information for image processing of images captured by the camera, the series of tasks for the second pipeline comprises tasks for performing the image processing using the restored context information, the series of tasks for the third pipeline comprises tasks for saving resulting context information after the image processing, and the hardware accelerator thread scheduler is further configured to:

detect the end of pipeline hardware event of the second pipeline;

in response to the end of pipeline hardware event of the second pipeline and the configuration settings of the third pipeline, initiate execution of the third pipeline;

detect the end of pipeline hardware event of the third pipeline; and receive a second initiate signal from the one or more processors to initiate execution of the first pipeline.

14. The system of claim 13, wherein each execution of the first pipeline, the second pipeline, and the third pipeline performs image processing on a different frame from images captured by the camera.

15. The system of claim 8, wherein:

for a third pipeline of the plurality of pipelines, the configuration settings include a clear pend enable flag that allows clearing of a pend block signal in a producer socket of a producer node in the third pipeline based on an internal event; and the hardware accelerator thread scheduler is further configured to:

detect the internal event, and in response to the internal event and the clear pend enable flag, clear the pend block signal in the producer socket.

16. A method, comprising:

receiving, by a hardware accelerator thread scheduler, a configuration of a first pipeline and a configuration of a second pipeline, wherein the configuration of the second pipeline includes a hardware enable flag configuration setting that specifies that the hardware accelerator thread scheduler is to detect a hardware trigger and, in response to the hardware trigger, initiate the second pipeline, wherein the hardware trigger in the configuration of the second pipeline is an end of pipeline hardware event of the first pipeline;

setting a register in the hardware accelerator thread scheduler with the configuration of the first pipeline and the configuration of the second pipeline;

receiving, by the hardware accelerator thread scheduler, an initiate signal for a first pipeline;

in response to the initiate signal, initiating, by the hardware accelerator thread scheduler, execution of the first pipeline;

detecting, by the hardware accelerator thread scheduler, the end of pipeline hardware event of the first pipeline; and in response to the end of pipeline event and the hardware enable flag configuration setting of the second pipeline, initiating, by the hardware accelerator thread scheduler, execution of the second pipeline.

17. The method of claim 16, wherein the end of pipeline hardware event comprises a hardware event from a hardware accelerator indicating completion of a last task in a series of tasks defined in the first pipeline.

18. The method of claim 16, wherein at least one task of a series of tasks of the first pipeline comprises an instruction to access memory external to a chip comprising the hardware accelerator thread scheduler.

19. The method of claim 16, further comprising:

receiving, by the hardware accelerator thread scheduler, a configuration of a third pipeline that includes a second hardware enable flag configuration setting that specifies that the hardware accelerator thread scheduler is to detect a second hardware trigger and, in response to the second hardware trigger, initiate the third pipeline, wherein:

the second hardware trigger in the configuration of the third pipeline is the end of pipeline hardware event of the second pipeline, a first series of tasks defined by the configuration of the first pipeline comprises tasks for restoring context information for image processing, a second series of tasks defined by the configuration of the second pipeline comprises tasks for performing image processing using the restored context information, and a third series of tasks defined by the configuration of the third pipeline comprises tasks for saving resulting context information after the image processing;

setting the register in the hardware accelerator thread scheduler with the configuration of the third pipeline;

detecting, by the hardware accelerator thread scheduler, the end of pipeline hardware event of the second pipeline;

in response to the end of pipeline hardware event of the second pipeline and the second hardware enable flag configuration setting of the third pipeline, initiating, by the hardware accelerator thread scheduler, execution of the third pipeline;

detecting, by the hardware accelerator thread scheduler, a third end of pipeline hardware event indicating completion of the third pipeline; and receiving, by the hardware accelerator thread scheduler, a second initiate signal from an external processor to initiate execution of the first pipeline.

20. The method of claim 16, further comprising:

receiving, by the hardware accelerator thread scheduler, a configuration of a third pipeline that includes a clear block enable flag configuration setting that allows clearing of a producer socket based on an internal event;

setting the register in the hardware accelerator thread scheduler with the configuration of the third pipeline;

detecting, by the hardware accelerator thread scheduler, the internal event; and in response to the internal event and the clear block enable flag configuration setting, clear, by the hardware accelerator thread scheduler, a pend block status of the producer socket.

* * * * *